US006075454A

United States Patent [19]

Yamasaki

[11] Patent Number: 6,075,454

[45] Date of Patent: Jun. 13, 2000

[54] KEYLESS ENTRY DEVICE

[75] Inventor: Shigenori Yamasaki, Miyagi-ken, Japan

[73] Assignee: Alps Electric Co., Ltd., Tokyo, Japan

[21] Appl. No.: 09/097,351

[22] Filed: Jun. 15, 1998

[30] Foreign Application Priority Data

Jun. 24, 1997 [JP] Japan .................................. 9-167467

[51] Int. Cl.[7] ................................................ G06F 7/04

[52] U.S. Cl. ............................... 340/825.31; 340/825.34; 307/10.5

[58] Field of Search ......................... 340/825.31, 825.34, 340/825.69, 825.72, 825.54; 307/10.1, 10.3, 10.5, 10.7; 342/22, 44, 51

[56] References Cited

U.S. PATENT DOCUMENTS 4,509,093 4/1985 Stellberger ......................... 340/825.31
5,412,379 5/1995 Waraksa et al. .................. 340/825.72

*Primary Examiner*—Howard L. Williams
*Assistant Examiner*—Jean B. Jeanglaude
*Attorney, Agent, or Firm*—Brinks Hofer Gilson & Lione

[57] ABSTRACT

A keyless entry device including a portable remote control for transmitting an operation signal in response to the reception of an interrogating signal and an onboard control module that is mounted on a vehicle. The onboard control module includes an anti-theft unit in which an operational state is selectively set, a transceiver for transmitting the interrogating signal and receiving the operation signal, a signal verifier for generating a reception acknowledge signal when the signal verifier determines that the received signal is legal, a proximity detector for generating a proximity signal when the portable remote control approaches the vehicle, a sensor unit for generating an actuation signal when the sensor unit senses a physical change in the vehicle, a door lock detector for generating a door-locked signal when the door is locked, a door controller for locking and unlocking the door of the vehicle, and a controller for releasing the anti-theft unit when the door-locked signal, the proximity signal and the reception acknowledge signal are concurrently issued with the anti-theft unit in the set state, and for unlocking the door of the vehicle when the reception acknowledge signal and the sensor actuation signal are concurrently issued with the anti-theft unit in the release state.

4 Claims, 5 Drawing Sheets

KEYLESS ENTRY DEVICE

BACKGROUND OF THE INVENTION

1. Field of the Invention

The present invention relates to a keyless entry device and, in particular, to a keyless entry device that functionally locks and unlocks a door of a car using a portable remote control carried by a car owner and an onboard control module or an onboard door controller, mounted on the car, while assuring safety of the car owner.

2. Description of the Related Art

Known keyless entry devices are conventionally employ a portable remote control carried by the owner or user of a car (vehicle) and a door control module mounted on the car. In such a keyless entry device, the portable remote control, at least, includes an operation panel on which a predetermined input operation is carried out, a function signal generator for generating a function signal in response to the operation on the operation panel, and an operation signal transmitter for converting the function signal into a wireless operation signal in the form of radiowave or infrared light to transmit it. The door control module, at least, includes a receiver for receiving the operation signal, an operation signal determining unit for determining whether the received operation signal is legal, and for generating a function signal responsive to the operation signal when the received operation signal is determined to be legal, and a door controller for locking or unlocking the door of the car in responsive to the function signal when the content of the function signal is for a door lock operation or door unlock operation.

In the keyless entry device thus constructed, the owner, at a distance from the car, operates the operation panel of the portable remote control when the owner wants locks (unlocks) a door of the car using the portable remote control. The function signal generator generates the function signal for door locking (or door unlocking) and the operation signal transmitter transmits the function signal as the operation signal to the onboard door control module. In the door control module, the receiver receives the operation signal, and the operation signal determining unit determines whether the operation signal is legal and converts the operation signal into the function signal indicative of door unlocking (door locking) when the operation signal is determined to be legal. The function signal is fed to the door controller. The door controller responds to the reception of the function signal, unlocking (locking) the car door.

In the known keyless entry device, the operation panel of the portable remote control needs to be operated, for example, a pushbutton needs to be pressed, when the car owner unlocks (locks) the car door using the portable remote control. When the owner carries a load with both hands with no free hand available to manipulate the operation panel, the owner needs to place temporarily the load somewhere or ask someone else to hold the load temporarily instead to make hands available to operate the portable remote control.

To eliminate such an inconvenience, there have been developed operation-free keyless entry devices in which a portable remote control (or a door control module or both) is designed to issue constantly an interrogating signal even with the portable remote control remaining unused. When the owner carrying the portable remote control with him or her approaches the car, an anti-theft unit or car security unit (or the portable remote control) receives the interrogating signal transmitted and senses the approaching owner, and the onboard door control module automatically puts the car door into an unlocked (or locked) state.

In the known operation-free keyless entry device, the owner having the portable remote control with him or her simply approaching the car puts the car door into an unlocked (locked) state. When the owner's hands are full, the door locking is effectively controlled. The door control module receives the interrogating signal depending on its level, and puts the car door into an unlocked or locked state. When the present location of the portable remote control, namely of the owner carrying the portable remote control is at a borderline from within which the door control module starts picking up the signal, or when an obstacle such as another car, present between the portable remote control and the door control module of own car, blocks the interrogating signal from the portable remote control and greatly changes the signal level at the door control module, the car door is frequently unintentionally switched between the unlocked state and the locked state even if the owner attempts to put the car door in the unlocked (locked) state. When the door control module of the owner car detects the proximity of the portable remote control putting automatically the car door into the unlocked state before the owner with the portable remote control actually arrives at the car, a stranger may open the car door during a short elapsed time between the unlocking of the car door and the actual time of arrival of the owner, and could steal any onboard instruments.

SUMMARY OF THE INVENTION

Accordingly, it is an object of the present invention to provide a keyless entry device that puts a door of a vehicle into an unlocked state when a portable remote control comes into the close vicinity of a vehicle on condition that a predetermined condition is satisfied In a first aspect, the keyless entry device of the present invention comprises a portable remote control carried by an owner of a vehicle and an onboard control module, wherein the portable remote control transmits an operation signal when the portable remote control receives an interrogating signal from the onboard control module, and wherein the onboard control module preferably comprises an anti-theft unit that is selectively put into a set state and a release state, a transceiver for transmitting the interrogating signal and receiving the operation signal, a signal verifier for determining whether the received operation signal is legal and for generating a reception acknowledge signal when the signal verifier determines that the received signal is legal, a proximity detector for generating a proximity signal when the portable remote control enters a predetermined range of the vehicle, a sensor unit for generating an actuation signal when the sensor unit senses a physical change in the vehicle, a door lock detector for generating a door-locked signal when the door lock detector detects a door of the vehicle locked, a door controller for locking and unlocking the door of the vehicle, and a controller for outputting a release signal to the anti-theft unit to release the anti-theft unit from the set state when the door-locked signal, the proximity signal and the reception acknowledge signal are concurrently issued with the anti-theft unit in the set state, and for outputting an unlock signal to the door controller to put the door of the vehicle into an unlocked state when the reception acknowledge signal and the sensor actuation signal are concurrently issued with the anti-theft unit in the release state.

According to the first aspect of the present invention, when the anti-theft unit in the onboard control module remains in the set state with the vehicle door locked, and when the owner of the vehicle carrying the portable remote control with him or her approaches the vehicle and then touches the vehicle, the controller in the onboard control module changes the door from the locked state to the unlocked state. The owner can put the door into the unlocked state by simply approaching the vehicle without any particular operation added to the portable remote control, in the same way as the known operation-free keyless entry device. A convenient keyless entry device thus results. With a minor design change introduced into components of the anti-theft unit of an known conventional keyless entry device of this type, the conventional device is modified to be as a keyless entry device of the present invention.

In a second aspect, the keyless entry device of the present invention comprises a portable remote control carried by an owner of a vehicle and an onboard door control module mounted on the vehicle, wherein the portable remote control transmits an operation signal when the portable remote control receives an interrogating signal from the door control module, and wherein the door control module comprises a transceiver for transmitting the interrogating signal and receiving the operation signal, a signal verifier for determining whether the received operation signal is legal and for generating a reception acknowledge signal when the signal verifier determines that the received signal is legal, a proximity detector for generating a proximity signal when the portable remote control enters a predetermined range of the vehicle, a sensor unit for generating an actuation signal when the sensor unit senses a physical change in the vehicle, a door lock detector for generating a door-locked signal when the door lock detector detects a door of the vehicle locked, a door controller for locking and unlocking a door of the vehicle, and a controller for outputting a unlock signal to the door controller to put the door of the vehicle into an unlocked state when the door-locked signal, the proximity signal, the reception acknowledge signal and the sensor actuation signal.

According to the second aspect of the present invention, when the anti-theft unit in the onboard control module remains in the set state with the vehicle door locked, and when the owner of the vehicle carrying the portable remote control with him or her approaches the vehicle and then touches the vehicle, the controller in the onboard control module changes the door from the locked state to the unlocked state. The owner can put the door into the unlocked state by simply approaching the vehicle without any particular operation added to the portable remote control, in the same way as the known operation-free keyless entry device. A convenient keyless entry device thus results. With a minor design change introduced into components of the anti-theft unit of an known conventional keyless entry device of this type, the conventional device is modified to be as a keyless entry device of the present invention.

In one preferred embodiment of the present invention, the keyless entry device comprises a portable remote control carried by an owner of a vehicle and an onboard control module, wherein the portable remote control transmits an operation signal when the portable remote control receives an interrogating signal from the onboard control module, and wherein the onboard control module comprises an anti-theft unit that is selectively put into a set state and a release state, a transceiver for transmitting the interrogating signal and receiving the operation signal, a signal verifier for determining whether the received operation signal is legal and for generating a reception acknowledge signal when the signal verifier determines that the received signal is legal, a proximity detector for generating a proximity signal when the portable remote control enters a predetermined range of the vehicle, a sensor unit for generating an actuation signal when the sensor unit senses a physical change in the vehicle, a door lock detector for generating a door-locked signal when the door lock detector detects a door of the vehicle locked, a door controller for locking and unlocking a door of the vehicle, and a controller for outputting a release signal to the anti-theft unit to release the anti-theft unit from the set state when the door-locked signal, the proximity signal and the reception acknowledge signal are concurrently issued with the anti-theft unit in the set state, and for outputting an unlock signal to the door controller to put the door of the vehicle into an unlocked state when the reception acknowledge signal and the sensor actuation signal are concurrently issued with the anti-theft unit in the release state.

In another preferred embodiment of the present invention, the door of the vehicle automatically reverts back to a locked state from the unlocked state after a predetermined time elapses from the moment the signal verifier issues the reception acknowledge signal, thereby putting the anti-theft unit into the set state.

In yet another preferred embodiment of the present invention, the keyless entry device comprises a portable remote control carried by an owner of a vehicle and an onboard door control module mounted on the vehicle, wherein the portable remote control transmits an operation signal when the portable remote control receives an interrogating signal from the door control module, and wherein the door control module comprises a transceiver for transmitting the interrogating signal and receiving the operation signal, a signal verifier for determining whether the received operation signal is legal and for generating a reception acknowledge signal when the signal verifier determines that the received signal is legal, a proximity detector for generating a proximity signal when the portable remote control enters a predetermined range of the vehicle, a sensor unit for generating an actuation signal when the sensor unit senses a physical change in the vehicle, a door lock detector for generating a door-locked signal when the door lock detector detects a door of the vehicle locked, a door controller for locking and unlocking the door of the vehicle, and a controller for outputting a unlock signal to the door controller to put the door of the vehicle into an unlocked state when the door-locked signal, the proximity signal, the reception acknowledge signal and the sensor actuation signal.

In yet another embodiment of the present invention, the door of the vehicle automatically reverts back to a locked state from the unlocked state after a predetermined time elapses from the moment the signal verifier issues the reception acknowledge signal.

According to the above preferred embodiments, the controller in the onboard control module monitors the locked state of the door, the proximity of the portable remote control to the vehicle, the touching of the owner to the vehicle body when the owner of the vehicle carrying the portable remote control with him or her approaches and then touches the vehicle with the anti-theft unit in the onboard control module in the set state and with the vehicle door locked. When the controller detects all of these states, the controller causes the door controller to shift automatically the door from the locked state to the unlocked state. The owner can put the door into the unlocked state by simply approaching and touching the vehicle without any particular operation added to the portable remote control, in the same way as the known operation-free keyless entry device. A convenient keyless entry device thus results. Rather than replacing components extensively in the onboard control module, a minor design change implemented into components of an existing onboard control module will modify the existing device to be as a keyless entry device of the present invention.

According to the above embodiments, the door automatically reverts back to the locked state when the door is not opened after a predetermined time elapses from the moment the door is shifted into the unlocked state. This arrangement prevents the door from being left unlocked for an unnecessarily long duration of time, protecting the vehicle and its onboard instruments against theft.

DESCRIPTION OF THE PREFERRED EMBODIMENTS

Figure 1:
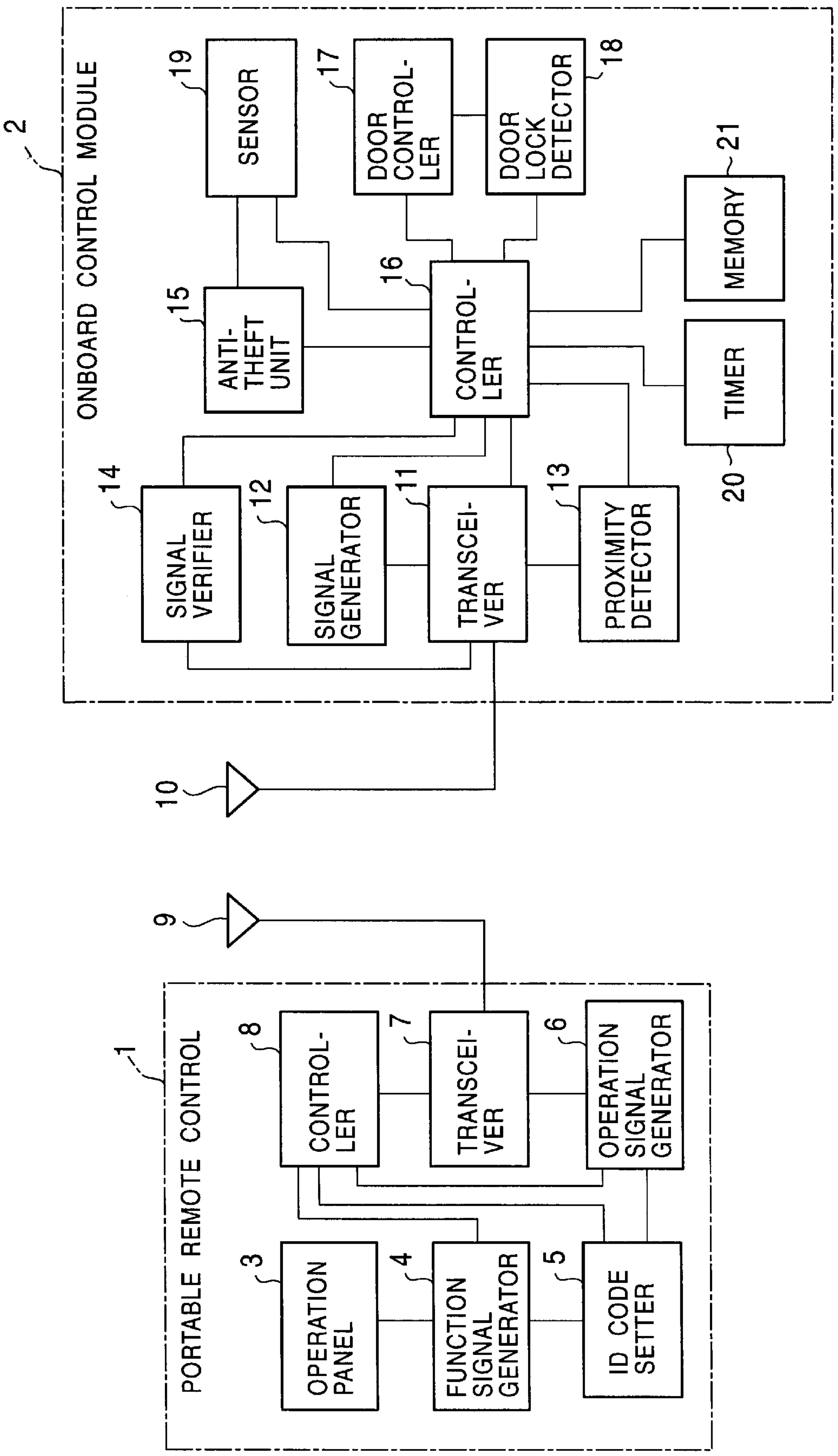
FIG. 1 is a block diagram showing a first embodiment of the keyless entry device of the present invention.

Referring to the drawings, the embodiments of the present invention are now discussed.

FIG. 1 is a block diagram showing a first embodiment of the keyless entry device of the present invention.

As shown, the keyless entry device includes a portable remote control 1 and an onboard control module 2. The portable remote control 1, typically carried by the owner or user of a car (vehicle), comprises an operation panel 3, a function signal generator 4, an ID code setter 5, an operation signal generator 6, a transceiver 7, a controller 8, and a transmitting/receiving antenna 9, with all interconnected as shown in FIG. 1. The onboard control module 2, typically mounted on a car (vehicle), comprises a transmitting/receiving antenna 10, a transceiver 11, a signal generator 12, a proximity detector 13, a signal verifier 14, an anti-theft unit 15, a controller 16, a door controller 17, a door lock detector 18, a sensor unit 19, a timer 20, and a memory 21, with all interconnected as shown in FIG. 1.

In the portable remote control 1, the operation panel 3 has a plurality of pushbuttons for carrying out a variety of functions. The function signal generator 4 generates the function signal of a pushbutton when that pushbutton is pressed on the operation panel 3, and feeds it to the ID code setter 5. The ID code setter 5 attaches to the fed function signal an ID code unique to the portable remote control 1, and feeds them to the operation signal generator 6. The operation signal generator 6 modulates a high-frequency signal by the function signal with the ID code to generate an operation signal, and feeds it to the transceiver 7. The transceiver 7 transmits the operation signal in the form of radiowave from the transmitting/receiving antenna 9, and also receives an interrogating signal by way of the transmitting/receiving antenna 9 and feeds it to the controller 8. The controller 8 controls generally the portable remote control 1, while determining at the same time whether the interrogating signal supplied by the transceiver 7 is legal.

In the onboard control module 2, the transceiver 11 receives the operation signal at the transmitting/receiving antenna 10, and feeds the received operation signal to the proximity detector 13 and the signal verifier 14 while transmitting the interrogating signal in the form of radiowave by way of the transmitting/receiving antenna 10. The signal generator 12 generates the interrogating signal and feeds it to the transceiver 11. The proximity detector 13 detects the level of the fed received operation signal, and generates a proximity signal when the level is above a predetermined level, and feeds the proximity signal to the controller 16. The signal verifier 14 determines whether the ID code contained in the received operation signal matches a pre-registered ID code, and generates a reception acknowledge signal when both codes match, and then feeds the reception acknowledge signal to the controller 16. The anti-theft unit 15 performs a security function, and is selectively switched, under the control of the controller 16, between a set state with the security function enabled and a release state with the security function disabled. The controller 16 generally controls the operation of the onboard control module 2 as will be described later. The door controller 17 sets a door of the car into either a locked state or an unlocked state under the control of the controller 16. The door lock detector 18 detects the locked state of the car door, and generates a door-locked signal when it detects the door locked, and feeds it to the controller 16. The sensor unit 19 is one of sensors for performing the security function of the car. When the owner partly touches the glass or the body of the car, the sensor unit 19 detects the touching, generates a sensor actuation signal, and feeds it directly, or indirectly via the anti-theft unit 15, to the controller 16. The timer 20 is the one for measuring a preset time, and is set or reset under the control of the controller 16. The memory 21 functions as an internal memory for the controller 16 or as an auxiliary memory for other components, and data writing to or data reading from the memory 21 is performed under the control of the controller 16.

Figure 2:
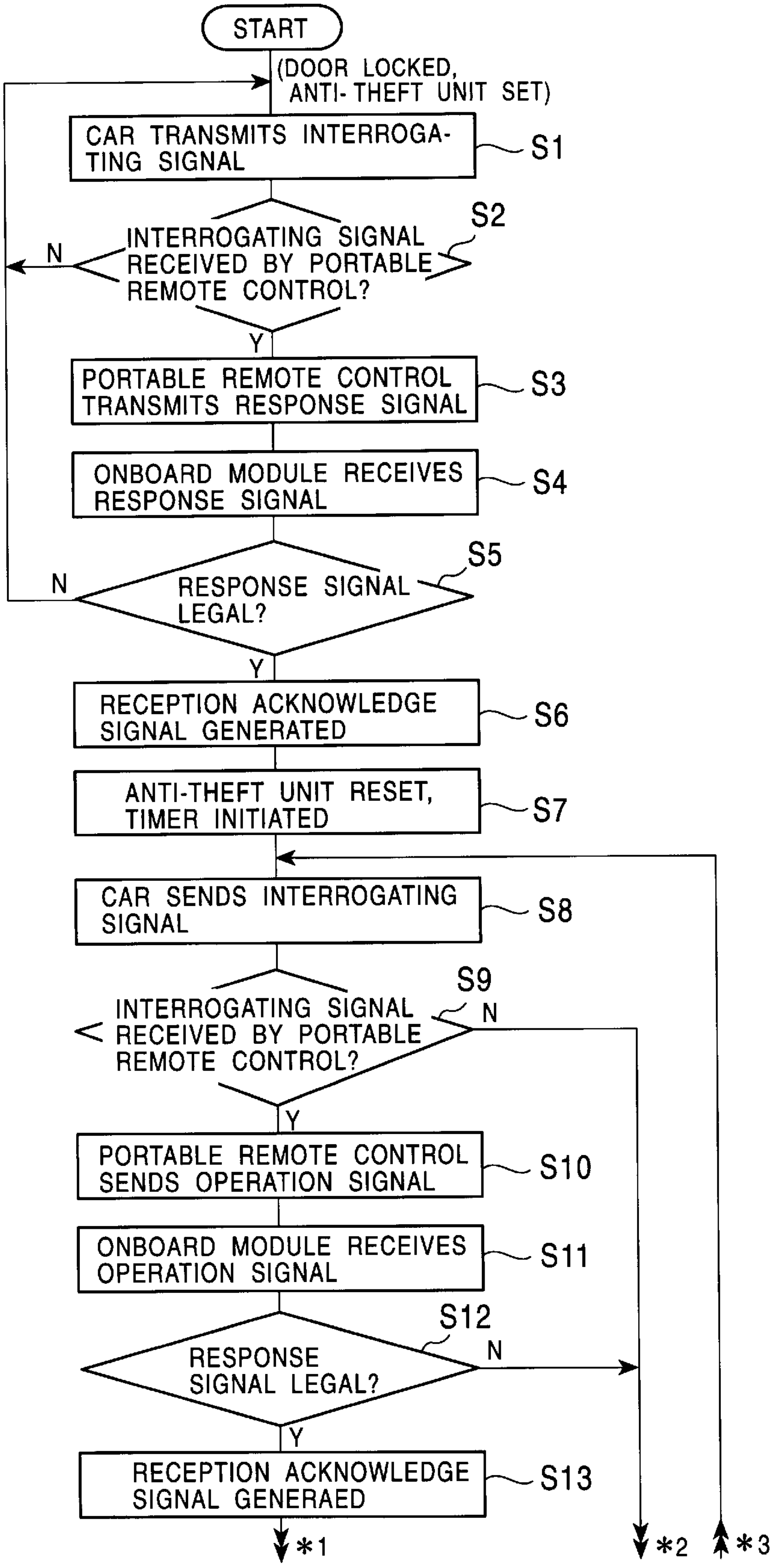
FIG. 2 is a flow diagram showing the operation of the first embodiment of the keyless entry device shown in FIG. 1.
Figure 3:
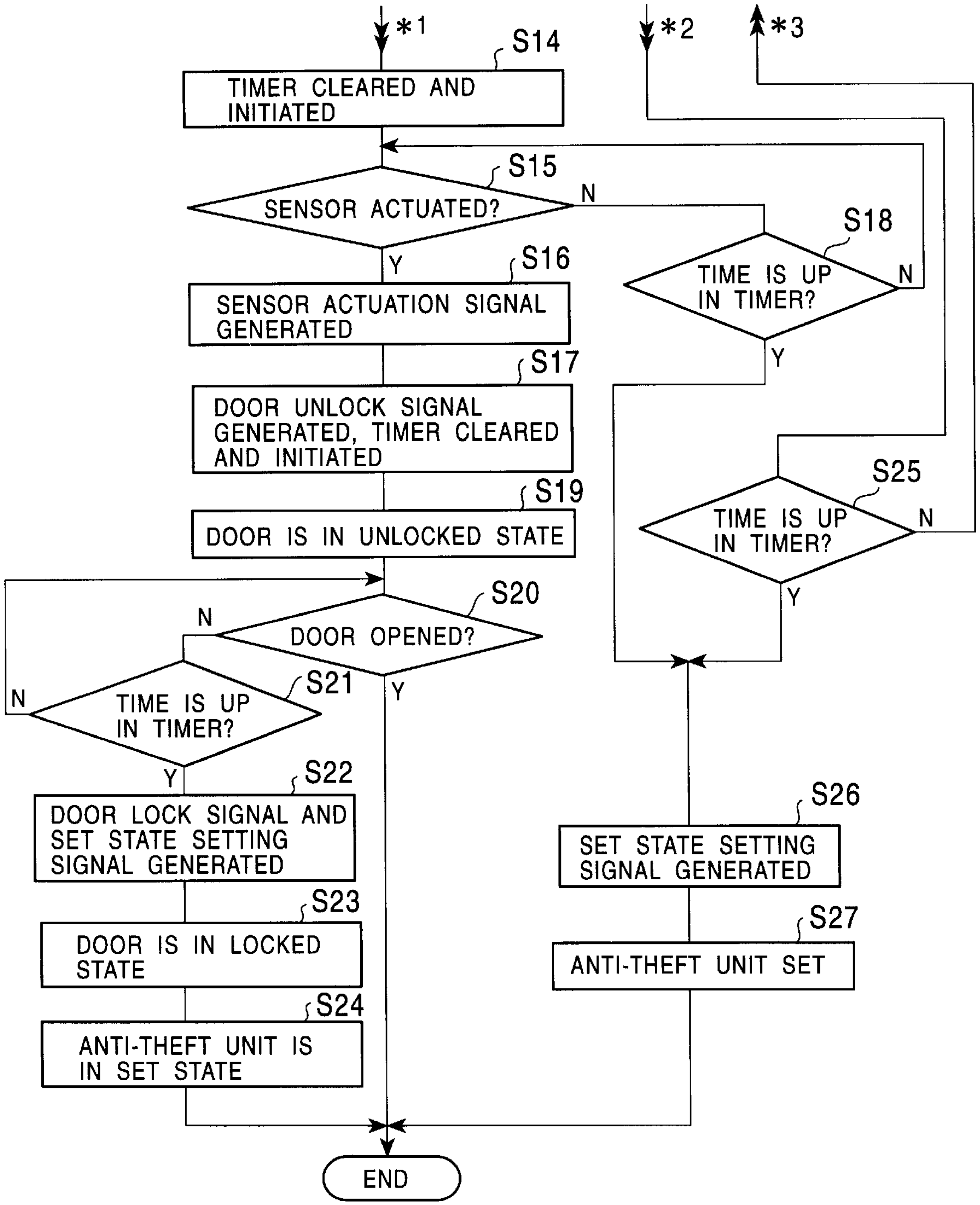
FIG. 3 is a continuation of the flow diagram of FIG. 2.

FIGS. 2 and 3 are a flow diagram showing the operation of the first embodiment of the keyless entry device shown in FIG. 1, FIG. 2 is a first portion of the diagram and FIG. 3 is a continuation of the diagram of FIG. 2.

Referring to FIGS. 2 and 3, the operation of the keyless entry device of this embodiment is discussed.

The keyless entry device of this embodiment, like the conventional car security system, has a glass sensor, a vibration sensor, and the like besides the sensor unit 19 such as a touch (capacity) sensor. When at least one of these sensors detects some one attempting to steal the car or something in the car such as any onboard instrument, that sensor causes the anti-theft unit in the set state to operate, permitting an alarm to go off. The door of the car is set in the locked state by the door controller 17.

In the keyless entry device of this embodiment, the onboard control module 2 sends intermittently the interrogating signal by way of the transceiver 11, while power to the portable remote control 1 is intermittently cut off to save power of a battery as a power source.

When the portable remote control 1, namely, the owner having the portable remote control 1 with him or her comes into a predetermined range of the car, the transceiver 7 in the portable remote control 1 receives the interrogating signal, and the portable remote control 1 switches itself from its intermittent mode to normal operation mode in response to the reception of the interrogating signal.

The signal strength of the interrogating signal is set such that the portable remote control 1 can receive it within a predetermined distance from the car.

Referring to FIG. 2, the operation of the device is now discussed. As the parenthetical note in FIG. 2 states, the car door is now in its locked state, and the door lock detector 18 detects the door being locked, generates a door-locked signal and feeds it to the controller 16. The door-locked signal is temporarily stored in the memory 21, and the anti-theft unit 15 in the onboard control module 2 remains in the set state, and the set state is also temporarily stored in the memory 21. Under this setting, the process shown in the flow diagram in FIG. 2 starts.

In step S1, the signal generator 12 in the onboard control module 2 intermittently generates the interrogating signal including at least a code, and the transceiver 11 transmits the interrogating signal in the form of radiowave from the transmitting/receiving antenna 10.

In step S2, the controller 8 in the portable remote control 1 determines, through the transceiver 7, whether the level of the interrogating signal transmitted by the onboard control module 2 is above a predetermined reception level and whether the content of the interrogating signal is correct. When the controller 8 determines that the received interrogating signal is above the predetermined level and correct in its content (Y in step S2), the process goes to step S3. When the controller 8 determines that the interrogating signal above the predetermined reception level is not yet received or that its content is not correct (N in step S2), the process returns to step S1 for starting over.

In step S3, the controller 8 in the portable remote control 1 sends a response signal with at least the ID code attached thereto (or operation signal) in the form of radiowave, through the transceiver 7.

In step S4, the transceiver 11 in the onboard control module 2 receives the response signal (or operation signal), and feeds it to both the proximity detector 13 and signal verifier 14. Upon determining that the received response signal (or received operation signal) is above a predetermined reception level, the proximity detector 13 generates a proximity signal, and sends the proximity signal to the controller 16 to cause the memory 21 to temporarily store the proximity signal, while validating the received response signal (or received operation signal) fed to the signal verifier 14.

In step S5, the signal verifier 14 in the onboard control module 2 compares the ID code contained in the received response signal (or received operation signal) with the ID code pre-registered to determine whether the received response signal (or received operation signal) is legal. When the signal verifier 14 determines that the received response signal (or received operation signal) is legal (Y in step S5), the process goes to step S6. When the signal verifier 14 determines that the received response signal (or received operation signal) is not legal (N in step S5), the process returns to step S1 for starting over.

In step S6, the signal verifier 14 in the onboard control module 2 generates a reception acknowledge signal and feeds it to the controller 16, which causes the memory 21 to store temporarily the reception acknowledge signal.

In step S7, the controller 16 in the onboard control module 2 feeds a release signal to the anti-theft unit 15 to set the anti-theft unit 15 into a released state while activating the timer 20 for time counting at the same time.

In step S8, the signal generator 12 in the onboard control module 2 intermittently generates the interrogating signal again to transmit it through the transceiver 11 and transmitting/receiving antenna 10 in the form of radiowave.

In step S9, the controller 8 in the portable remote control 1 determines, through the transceiver 7, whether the interrogating signal transmitted by the onboard control module 2 is received at a level above a predetermined reception level. When the controller 8 determines that the received interrogating signal is above the predetermined reception level (Y in step S9), the process goes to step S10. When the controller 8 determines that the interrogating signal above the predetermined reception level remains to be received (N in step S9), the process goes to step S25 shown in FIG. 23.

In step S10, the controller 8 in the portable remote control 1 transmits the operation signal with at least the ID code attached thereto in the form of radiowave through the transceiver 7.

In step S11, the transceiver 11 in the onboard control module 2 receives the operation signal and feeds it to both the proximity detector 13 and signal verifier 14. Upon determining that the received operation signal is above a predetermined reception level, the proximity detector 13 generates a proximity signal, and sends the proximity signal to the controller 16 to cause the memory 21 to temporarily store the proximity signal, while validating the received operation signal fed to the signal verifier 14.

In step S12, the signal verifier 14 in the onboard control module 2 compares the ID code contained in the received operation signal with the ID code pre-registered to determine whether the received operation signal is legal. When the signal verifier 14 determines that the received operation signal is legal (Y in step S12), the process goes to step S13. When the signal verifier 14 determines that the received operation signal is not legal (N in step S12), the process goes to step S25 shown in FIG. 3.

In step S13 the signal verifier 14 in the onboard control module 2 generates a reception acknowledge signal and feeds it to the controller 16, which in turn causes the memory 21 to temporarily store the reception acknowledge signal.

The process thereafter is shown in FIG. 3. In step S14, the controller 16 in the onboard control module 2 clears and then activates the timer 20.

In step S15, the anti-theft unit 15 in the onboard control module 2 determines, through the sensor unit 19, whether the body or glass of the car is touched by something or someone. When the anti-theft unit 15 determines that there has been a touching (Y in step S15), the process goes to step S16. When the anti-theft unit 15 determines that there has been no touching (N in step S15), the process goes to step S18.

In step S16, the anti-theft unit 15 in the onboard control module 2 generates an actuation signal and feeds it to the controller 16, which in turn causes the memory 21 to temporarily store the actuation signal.

In step S17, the controller 16 in the onboard control module 2 checks the presence of the status of the anti-theft unit 15, the door-locked signal, the reception acknowledge signal and the sensor actuation signal temporarily stored in the memory 21, and then generates a door unlock signal to feed it to the door controller 17. The controller 16 clears and activates the timer 20 at the same time.

In step S18, the controller 16 in the onboard control module 2 determines whether a preset time is up in the timer 20. When the controller 16 determines that the preset time is up in the timer 20 (Y in step S18), the process goes to step S26. When the controller 16 determines that the preset time is not yet up (N in step S18), the process returns to step S15 for repeating step S15 thereafter.

In step S19, the door controller 17 in the onboard control module 2 sets the door in an unlocked state in response to the door unlock signal, and the door lock detector 18 feeds a door-unlocked signal to the controller 16 to store it in the memory 21.

In step S20, the controller 16 in the onboard control module 2 determines whether the door is opened. When the controller 16 determines that the door is opened (Y in step S20), a series of process steps come to an end. When the controller 16 determines that the door is not yet opened (N in step S20), the process goes to step S21.

In step S21, the controller 16 in the onboard control module 2 determines whether a preset time is up in the timer 20. When the controller 16 determines that the preset time is up (Y in step S21), the process goes to step S22. When the controller 16 determines that the preset time is not yet up (N in step S21), the process returns to step S20 to repeat it.

In step S22, the controller 16 in the onboard control module 2 generates a door lock signal and a set-state setting signal and feeds the door lock signal and the set-state setting signal to the door controller 17 and the anti-theft unit 15, respectively.

In step S23, the door controller 17 in the onboard control module 2 sets the door in a locked state in response to the door lock signal, and the door lock detector 18 feeds a door-locked signal to the controller 16 to cause the memory 21 to store the door-locked signal.

In step S24, the anti-theft unit 15 in the onboard control module 2 is put into the set state in response to the set-state setting signal, and thereby a series of process steps come to an end.

In step S25, the controller 16 in the onboard control module 2 determines whether a preset time is up in the timer 20. When the controller 16 determines that the preset time is up (Y in step S25), the process goes to step S26. When the controller 16 determines that the preset time is not yet up (N in step S25), the process returns to step S8 for starting over.

In step S26, the controller 16 in the onboard control module 2 generates a set-state setting signal to feed it to the anti-theft unit 15.

In step S27, the anti-theft unit 15 in the onboard control module 2 is put into the set state in response to the set-state setting signal, and a series of process steps come to an end.

According to the first embodiment of the keyless entry device, the controller 16 in the onboard control module 2 changes the setting of the door from the locked state to the unlocked state when the owner of the car carrying the portable remote control 1 with him or her approaches and then touches the car with the door of the car (vehicle) locked with and the anti-theft unit 15 in the onboard control module 2 in the set state. Like the known operation-free keyless entry device, the car owner can unlock the car by simply making the portable remote control 1 approach the car without the need for any operation of the portable remote control 1. A convenient and easy-to-use portable remote control is thus provided. With a minor design change introduced into components of an known conventional keyless entry device of this type, the conventional device is modified to be as a keyless entry device of the present invention, and thus the manufacturing cost involved is low.

According to this embodiment of the keyless entry device, the door automatically reverts back to the locked state and the anti-theft unit 15 is put into the set state again, when a predetermined time elapses from the moment the car door is unlocked, for example, when the car owner having the portable remote control 1 with him or her leaves the car without opening the door after having approached once the car. The car and onboard instruments are thus prevented from being stolen.

Figure 4:
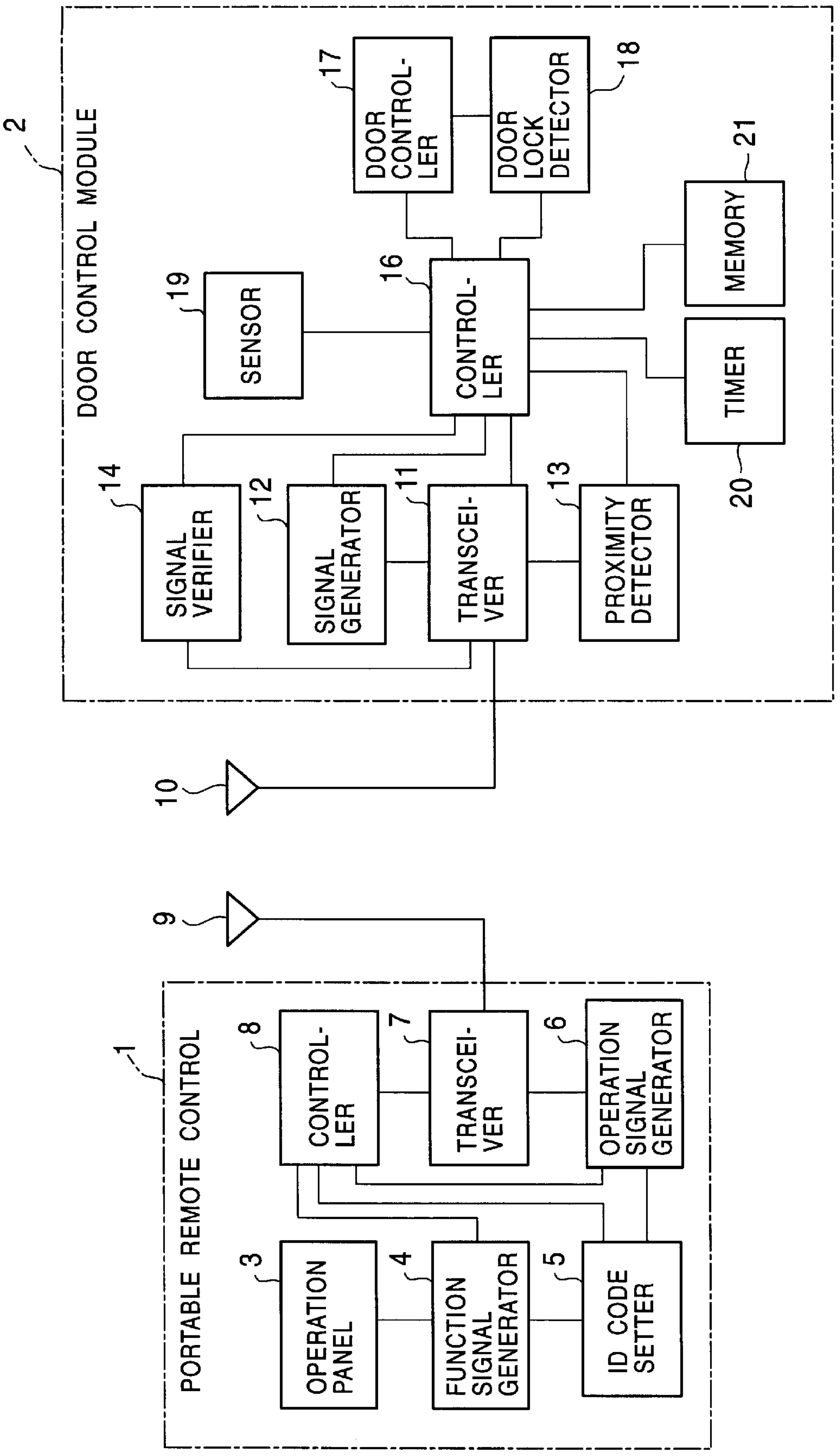
FIG. 4 is a block diagram showing a second embodiment of the keyless entry device of the present invention.

FIG. 4 is a block diagram of a second embodiment of the keyless entry device of the present invention.

In FIG. 4, components identical to those described with reference to FIG. 1 are designated with the same reference numerals.

As shown in FIG. 4, the car is equipped with an onboard control module 2' which is a substitute for the onboard control module 2 in the first embodiment. The portable remote control 1 in the second embodiment remains identical to the counterpart in the first embodiment. The onboard control module 2' is different from the onboard control module 2 in that the onboard control module 2' is not provided with the anti-theft unit 15, and the rest of the construction of the second embodiment remains unchanged from that of the first embodiment. No further discussion is therefore provided about the construction of the second embodiment.

Figure 5:
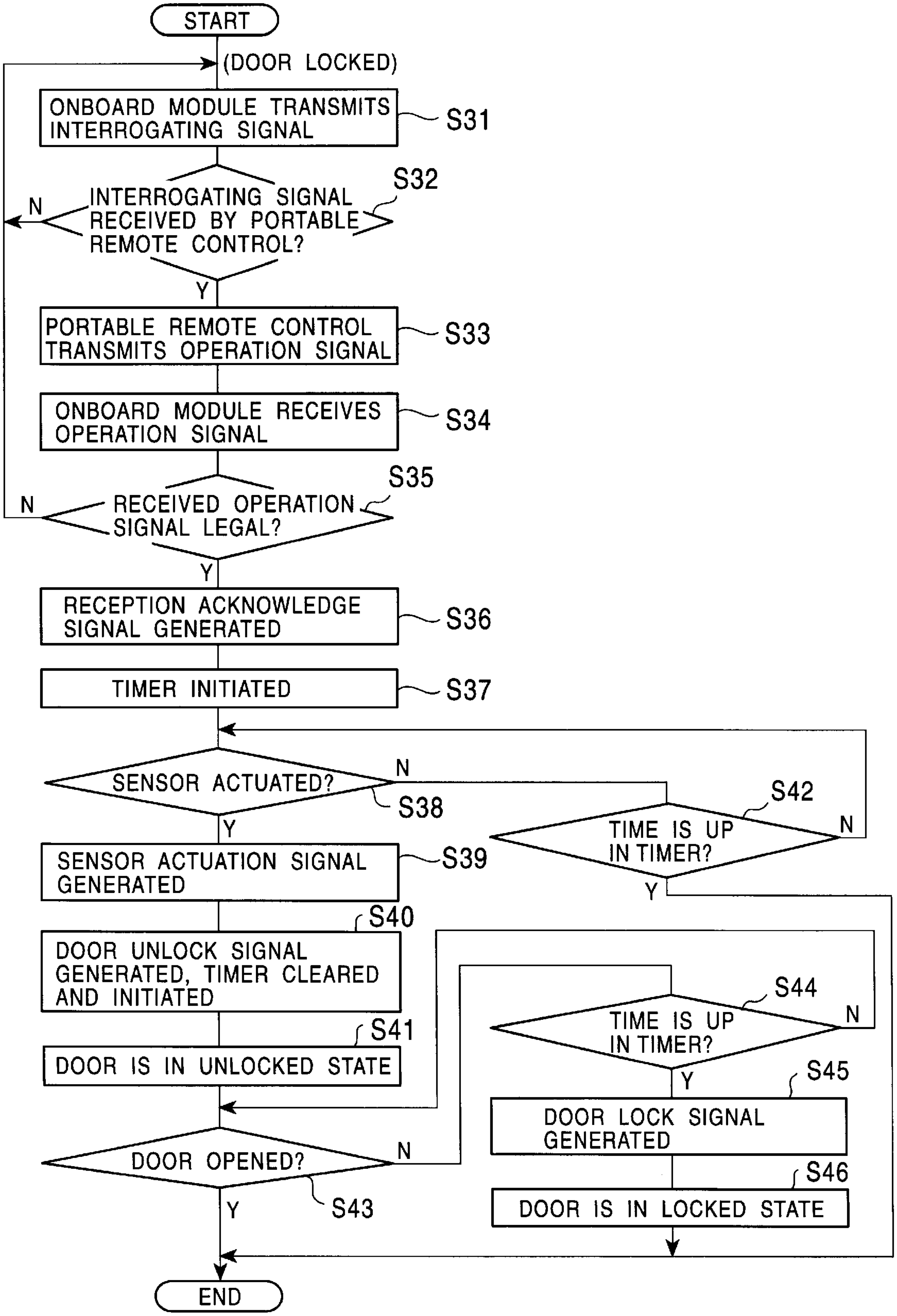
FIG. 5 is a flow diagram showing the operation of the second embodiment of the keyless entry device shown in FIG. 4.

Referring to FIG. 5, the operation of the second embodiment of the keyless entry device is now discussed. As the parenthetical note in FIG. 5 states, the car door is now in its locked state, and the door lock detector 18 detects the door being locked, generates a door-locked signal and feeds it to the controller 16. The door-locked signal is temporarily stored in the memory 21. Under this setting, the process shown in the flow diagram in FIG. 5 starts.

In step S31, the signal generator 12 in the onboard control module 2' intermittently generates the interrogating signal including at least a code, and the transceiver 11 transmits the interrogating signal in the form of radiowave from the transmitting/receiving antenna 10.

In step S32, the controller 8 in the portable remote control 1 determines, through the transceiver 7, whether the level of the interrogating signal transmitted by the onboard control module 2' is above a predetermined reception level and whether the content of the interrogating signal is correct. When the controller 8 determines that the received interrogating signal is above the predetermined level and correct in its content (Y in step S32), the process goes to step S33. When the controller 8 determines that the interrogating signal above the predetermined reception level is not yet received or that its content is not correct (N in step S32), the process returns to step S31 for starting over.

In step S33, the controller 8 in the portable remote control 1 sends an operation signal with at least the ID code attached thereto (or response signal) in the form of radiowave, through the transceiver 7.

In step S34, the transceiver 11 in the onboard control module 2' receives the operation signal, and feeds it to both the proximity detector 13 and signal verifier 14. Upon determining that the received operation signal is above a predetermined reception level, the proximity detector 13 generates a proximity signal, and sends the proximity signal to the controller 16 to cause the memory 21 to temporarily store the proximity signal, while validating the received operation signal fed to the signal verifier 14.

In step S35, the signal verifier 14 in the onboard control module 2' compares the ID code contained in the received operation signal with the ID code pre-registered to determine whether the received operation signal is legal. When the signal verifier 14 determines that the received operation signal is legal (Y in step S35), the process goes to step S36. When the signal verifier 14 determines that the received operation signal is not legal (N in step S35), the process returns to step S31 for starting over.

In step S36, the signal verifier 14 in the onboard control module 2' generates a reception acknowledge signal and feeds it to the controller 16, which causes the memory 21 to store temporarily the reception acknowledge signal.

In step S37, the controller 16 in the onboard control module 2' activates the timer 20 for time counting at the same time.

In step S38, the controller 16 in the onboard control module 2' determines, through the sensor unit 19, whether the body or glass of the car is touched by something or someone. When the controller 16 determines that there has been a touching (Y in step S38), the process goes to step S39. When the controller 16 determines that there has been no touching (N in step S38), the process goes to step S42.

In step S39, the controller 16 in the onboard control module 2' generates a sensor actuation signal, which is then temporarily stored in the memory 21.

In step S40, the controller 16 in the onboard control module 2' checks the presence of the door-locked signal, the reception acknowledge signal and the sensor actuation signal temporarily stored in the memory 21, and then generates a door unlock signal to feed it to the door controller 17. The controller 16 clears and activates the timer 20 at the same time.

In step S41, the door controller 17 in the onboard control module 2' sets the door in an unlocked state in response to the door unlock signal, and the door lock detector 18 feeds a door-unlocked signal to the controller 16 to store it in the memory 21.

In step S42, the controller 16 in the onboard control module 2' determines whether a preset time is up in the timer 20. When the controller 16 determines that the preset time is up in the timer 20 (Y in step S42), a series of process steps come to an end. When the controller 16 determines that the preset time is not yet up (N in step S42), the process returns to step S38 for repeating step S38 thereafter.

In step S43, the controller 16 in the onboard control module 2' determines whether the door is opened. When the controller 16 determines that the door is opened (Y in step S43), a series of process steps come to an end. When the controller 16 determines that the door is not yet opened (N in step S43), the process goes to step S44.

In step S44, the controller 16 in the onboard control module 2' determines whether a preset time is up in the timer 20. When the controller 16 determines that the preset time is up (Y in step S44), the process goes to step S45. When the controller 16 determines that the preset time is not yet up (N in step S44), the process returns to step S43 to repeat it.

In step S45, the controller 16 in the onboard control module 2' generates a door lock signal and feeds it to the door controller 17.

In step S46, the door controller 17 in the onboard control module 2' sets the door in a locked state in response to the door lock signal, and the door lock detector 18 feeds a door-locked signal to the controller 16 to cause the memory 21 to store the door-locked signal. A series of process steps come to an end.

According to the second embodiment of the keyless entry device, the controller 16 in the onboard control module 2' changes the setting of the door from the locked state to the unlocked state when the owner of the car carrying the portable remote control 1 with him or her approaches and then touches the car with the door of the car (vehicle) locked. Like the known operation-free keyless entry device, the car owner can unlock the car by simply making the portable remote control 1 approach the car without the need for any operation of the portable remote control 1. A convenient and easy-to-use portable remote control is thus provided. With a minor design change introduced into components of an known conventional keyless entry device of this type, the conventional device is modified to be as a keyless entry device of the present invention, and thus the manufacturing cost involved is low.

According to the second embodiment of the keyless entry device, the door automatically reverts back to the locked state when a predetermined time elapses from the moment the car door is unlocked, for example, when the car owner having the portable remote control 1 with him or her leaves the car without opening the door after having approached once the car. The car and onboard instruments are thus prevented from being stolen.

In the first and second embodiments, the interrogating signal, response signal and operation signal are communicated in the form of radiowave. Alternatively, other forms of transmission signal may be used. For example, infrared or ultrasonic wave may be employed.

In the first and second embodiments, the keyless entry device is used in the vehicle. Alternatively, the keyless entry device of the present invention may be used to lock and unlock keys for homes or any other buildings.

According to the first aspect of the present invention, the controller in the onboard control module changes the door from the locked state to the unlocked state when the owner of the car carrying the portable remote control with him or her with him or her approaches and then touches the car with the anti-theft unit in the onboard control module in the set state and with the car door locked. The owner can put the door into the unlocked state by simply approaching the car without any particular operation added to the portable remote control, in the same way as the known operation-free keyless entry device. A convenient keyless entry device thus results. With a minor design change introduced into components of the anti-theft unit of an known conventional keyless entry device of this type, the conventional device is modified to be as a keyless entry device of the present invention.

According to the second aspect of the present invention, the controller in the onboard control module changes the door from the locked state to the unlocked state when the owner of the car carrying the portable remote control with him or her approaches and then touches the car with the anti-theft unit in the onboard control module in the set state and with the car door locked. The owner can put the door into the unlocked state by simply approaching the car without any particular operation added to the portable remote control, in the same way as the known operation-free keyless entry device. A convenient keyless entry device thus results. With a minor design change introduced into components of the anti-theft unit of an known conventional keyless entry device of this type, the conventional device is modified to be as a keyless entry device of the present invention.

What is claimed is:

1. A keyless entry device comprising a portable remote control carried by an owner of a vehicle and an onboard control module mounted on the vehicle, wherein the portable remote control transmits an operation signal when the portable remote control receives an interrogating signal from the onboard control module, and wherein the onboard control module comprises an anti-theft unit that is selectively put into a set state and a release state, a transceiver for transmitting the interrogating signal and receiving the operation signal, a signal verifier for determining whether the received operation signal is legal and for generating a reception acknowledge signal when the signal verifier determines that the received signal is legal, a proximity detector for generating a proximity signal when the portable remote control enters a predetermined range of the vehicle, a sensor unit for generating an actuation signal when the sensor unit senses a physical change in the vehicle, a door lock detector for generating a door-locked signal when the door lock detector detects a door of the vehicle locked, a door controller for locking and unlocking the door of the vehicle, and a controller for outputting a release signal to the anti-theft unit to release the anti-theft unit from the set state when the door-locked signal, the proximity signal and the reception acknowledge signal are concurrently issued with the anti-theft unit in the set state, and for outputting an unlock signal to the door controller to put the door of the vehicle into an unlocked state when the reception acknowledge signal and the sensor actuation signal are concurrently issued with the anti-theft unit in the release state.

2. A keyless entry device according to claim 1, wherein the door of the vehicle automatically reverts back to a locked state from the unlocked state after a predetermined time elapses from the moment the signal verifier issues the reception acknowledge signal, thereby putting the anti-theft unit into the set state.

3. A keyless entry device comprising a portable remote control carried by an owner of a vehicle and an onboard door control module mounted on the vehicle, wherein the portable remote control transmits an operation signal when the portable remote control receives an interrogating signal from the door control module, and wherein the door control module comprises a transceiver for transmitting the interrogating signal and receiving the operation signal, a signal verifier for determining whether the received operation signal is legal and for generating a reception acknowledge signal when the signal verifier determines that the received signal is legal, a proximity detector for generating a proximity signal when the portable remote control enters a predetermined range of the vehicle, a sensor unit for generating an actuation signal when the sensor unit senses a physical change in the vehicle, a door lock detector for generating a door-locked signal when the door lock detector detects a door of the vehicle locked, a door controller for locking and unlocking the door of the vehicle, and a controller for outputting an unlocking signal to the door controller to put the door of the vehicle into an unlocked state when the door-locked signal, the proximity signal, the reception acknowledge signal and the sensor actuation signal.

4. A keyless entry device according to claim 3, wherein the door of the vehicle automatically reverts back to a locked state from the unlocked state after a predetermined time elapses from the moment the signal verifier issues the reception acknowledge signal.

* * * * *